(12) United States Patent
Harris et al.

(10) Patent No.: US 7,319,879 B2
(45) Date of Patent: Jan. 15, 2008

(54) METHOD AND APPARATUS FOR PROVIDING DISPATCH-TYPE SERVICES IN A CELLULAR COMMUNICATION SYSTEM

(75) Inventors: John M. Harris, Chicago, IL (US); Jay Jayapalan, Buffalo Grove, IL (US); Philip Joseph Fleming, Glen Ellyn, IL (US)

(73) Assignee: Mototola, Inc., Schaumburg, IL (US)

( * ) Notice: Subject to any disclaimer, the term of this patent is extended or adjusted under 35 U.S.C. 154(b) by 35 days.

(21) Appl. No.: 10/334,814

(22) Filed: Dec. 31, 2002

(65) Prior Publication Data

US 2004/0127233 A1    Jul. 1, 2004

(51) Int. Cl.
*H04Q 7/20* (2006.01)

(52) U.S. Cl. .................. 455/458; 455/518; 455/521; 455/463; 379/93.21; 379/158; 379/202.1; 340/7.46; 340/10.32

(58) Field of Classification Search ............. 455/518, 455/519, 521, 458, 450, 424, 463, 456.2; 340/7.46, 10.32; 379/93.21, 158, 202.1
See application file for complete search history.

(56) References Cited

U.S. PATENT DOCUMENTS

| | | | | |
|---|---|---|---|---|
| 5,835,860 A * | 11/1998 | Diachina | ..................... | 455/458 |
| 6,208,872 B1 * | 3/2001 | Schmidt | ..................... | 455/518 |
| 6,385,461 B1 * | 5/2002 | Raith | ......................... | 455/518 |
| 6,405,050 B1 * | 6/2002 | Amirijoo et al. | ........... | 455/518 |
| 6,442,396 B1 * | 8/2002 | Schmidt et al. | ............. | 455/518 |

* cited by examiner

*Primary Examiner*—Nghi H. Ly

(57) ABSTRACT

An interconnect communication system is provided that provides for dispatch-type services including Instant Access call set up, talkgroup creation and management, and in-band floor arbitration and mode switching that employ in-band signaling tones. By providing talkgroup creation and management and in-band floor arbitration that are transparent to the underlying network, the talkgroup creation and management and in-band floor arbitration may be implemented in a legacy system without the need to modify the network and regardless of the type of network employed. Furthermore, by providing Instant Access call set up procedures and mode switching procedures that are capable of utilizing modified versions of known messages, the procedures may be implemented in a legacy system in a simplified manner, minimizing the impact of an addition of such procedures to a legacy network.

46 Claims, 8 Drawing Sheets

METHOD AND APPARATUS FOR PROVIDING DISPATCH-TYPE SERVICES IN A CELLULAR COMMUNICATION SYSTEM

FIELD OF THE INVENTION

The present invention relates generally to cellular communication systems, and, in particular, to provision of dispatch communication services in an interconnect cellular communication system.

BACKGROUND OF THE INVENTION

Recently it has been proposed to add dispatch capabilities to Code Division Multiple Access (CDMA) communications systems, such as a cdma2000 communication system. Unlike the interconnect services provided by today's cellular systems, dispatch services have been traditionally provided by two-way radio systems. Such services allow a user to communicate in ways that are difficult or costly using today's cellular systems. Such services also allow for instant access by a mobile station originating a call to target mobile stations. For example, a dispatch group call service enables a user to communicate with a group of people simultaneously and instantaneously, typically by depressing a push-to-talk (PTT) key. Using a cellular system, such a call could not occur instantaneously since either telephone numbers would need to be dialed for a three-way call or arrangements would need to be made to setup a conference call. Likewise, a dispatch point to point call service enables a user to communicate with another user quickly and spontaneously, again typically by depressing a PTT key. This feature is ideal for two people who are working together but are unable to speak with one another directly such as two people working in concert but in different parts of a building. Where a wireless telephone call may be more appropriate for a conversation, short messages between two people as they work are better facilitated by the dispatch point to point call service.

Low delay is also a critical factor in any dispatch call. For example, setup delay that is acceptable for a typical interconnect voice call can be unacceptable for dispatch services which rely on a very fast connection being made to the called party. Accordingly, as noted above, dispatch services provide Instant Access call setup. However, a problem in implementing a dispatch system in a cellular communication system is that some telephones in the system will be dispatch enabled while legacy phones may not be so enabled. Furthermore, dispatch services permit only a single speaker to speak, or transmit, at a time while all others must receive, while typical interconnect systems allow each participant to concurrently transmit and receive. Users engaged in a dispatch communication session may find the dispatch service to be too constraining if the call turns into an extended conversation and may desire to switch to an interconnect communication session during the course of the call.

Therefore, a need exists for a method and apparatus that allows for fast interconnections required by dispatch users, that does not require that the user equipment be typical dispatch radiotelephones, and that permits users engaged in a dispatch communication session to switch to an interconnect communication session when the users so desire.

DETAILED DESCRIPTION OF THE INVENTION

Figure 1:
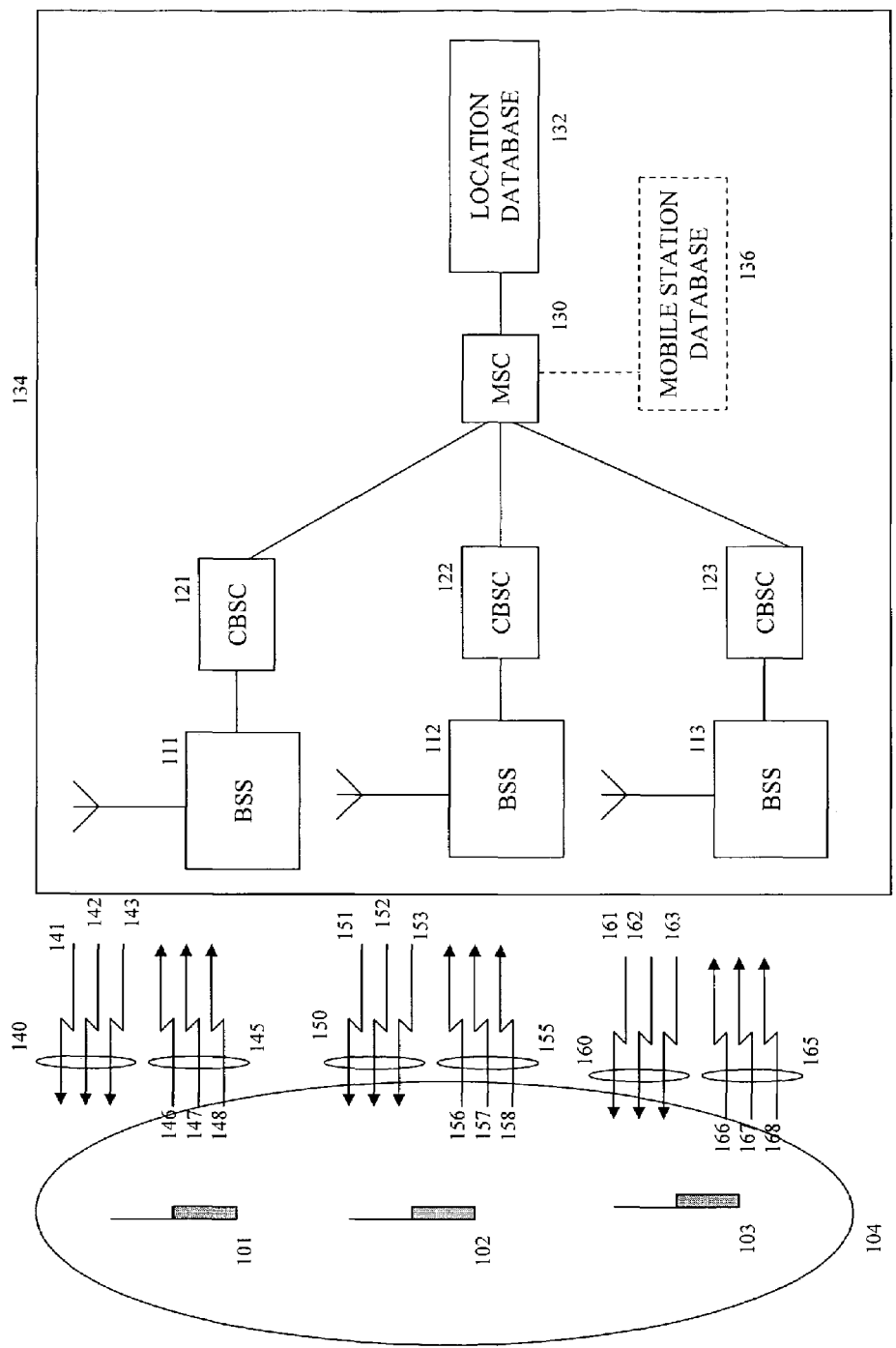
FIG. 1 is a block diagram of a wireless communication system in accordance with an embodiment of the present invention.

To address the need for a method and an apparatus that allows for fast interconnections required by dispatch users, that does not require that the user equipment be typical dispatch radiotelephones, and that permits users engaged in a dispatch communication session to switch to an interconnect communication session when the users so desire, an interconnect communication system is provided that provides for dispatch-type services including Instant Access call set up, talkgroup creation and management, and in-band floor arbitration and mode switching that employ in-band signaling tones. By providing talkgroup creation and management and in-band floor arbitration that are transparent to the underlying network, the talkgroup creation and management and in-band floor arbitration may be implemented in a legacy system without the need to modify the network and regardless of the type of network employed. Furthermore, by providing Instant Access call set up procedures and mode switching procedures that are capable of utilizing modified versions of known messages, the procedures may be implemented in a legacy system in a simplified manner, minimizing the impact of an addition of such procedures to a legacy network.

Generally, an embodiment of the present invention encompasses a method for establishing an Instant Access voice call in a wireless communication system. The method includes receiving, from a first mobile station, a request to initiate an Instant Access voice call, wherein the request proposes a mode of the Instant Access voice call and, in response to receiving the request, paging a second mobile station with a paging message, wherein the paging message informs of the proposed mode of the Instant Access voice call. The method further includes determining, based on a response to the paging message by the second mobile station, whether to establish the proposed mode of the voice call.

Another embodiment of the present invention encompasses a method for initiating, by a mobile station, an Instant Access voice call in a wireless communication system. The method includes receiving, from a user of the mobile station, a first request to initiate a proposed mode of Instant Access voice call, in response to receiving the first request, generating a second request to initiate a proposed mode of Instant Access voice call, and conveying the second request to an infrastructure.

Yet another embodiment of the present invention encompasses a method for establishing, by a mobile station, an Instant Access voice call in a wireless communication system. The method includes receiving a paging message requesting participation in a proposed mode of an Instant Access voice call and determining, based on the received paging message, whether to accept the proposed mode of the Instant Access voice call.

Still another embodiment of the present invention encompasses a method for providing in-band speaker arbitration by a mobile station in a wireless communication session involving multiple participants. The method includes receiving a first in-band signaling tone corresponding to a request by a second mobile station to reserve a floor of the communication session and, in response to receiving the first in-band signaling tone, conveying a second in-band signaling tone that controls access by the second mobile station to the floor of the communication session.

Yet another embodiment of the present invention encompasses a method for converting a voice call from one of a dispatch mode voice call or an interconnect mode voice call to the other mode voice call. The method includes receiving, by a mobile station via a traffic channel, a request to switch over to the other mode voice call, wherein the request comprises an in-band signaling tone and determining, by the mobile station, whether to switch to the other mode voice call based on the received request.

Still another embodiment of the present invention encompasses a method for converting a voice call from one of a dispatch mode voice call or an interconnect mode voice call to the other mode voice call. The method includes receiving, from a user of a mobile station, a request to switch a mode of the voice call, in response to receiving the request, generating, by the mobile station, an in-band signaling tone, and conveying, via a traffic channel, a request to switch over to the other mode voice call, wherein the request comprises the in-band signaling tone.

Yet another embodiment of the present invention encompasses a method for creating a talkgroup by a first mobile station. The method includes selecting, by the mobile station, a second mobile station as a member of the talkgroup and storing, by the mobile station, an association between a first mobile station (MS) identifier associated with first mobile station and a second MS identifier associated with the second mobile station. The method further includes conveying talkgroup information by the first mobile station to the second mobile station, wherein the talkgroup information comprises the first MS identifier in association with the second MS identifier.

Yet another embodiment of the present invention encompasses a mobile station capable of participating in an Instant Access voice call. The mobile station includes a memory coupled to a processor. The memory stores service option values corresponding to modes of an Instant Access call. The processor receives, from a user of the mobile station, a first request to initiate a proposed mode of Instant Access voice call, in response to receiving the first request, generates a call origination message having a Service Option (SO) data field, embeds a value in the SO data field that informs of the proposed mode the Instant Access voice call, and conveys the call origination message to an infrastructure.

Still another embodiment of the present invention encompasses a mobile station capable of participating in an Instant Access voice call. The mobile station includes a memory coupled to a processor. The memory stores Service Option (SO) values corresponding to proposed modes of an Instant Access call. The processor receives a paging message having an SO data field and determines, based on a value embedded in the SO data field and by reference to the memory, that the mobile station is being requested to participate in a proposed mode of an Instant Access voice call.

Yet another embodiment of the present invention encompasses a first mobile station that performs in-band speaker arbitration in a wireless communication session involving multiple participants. The first mobile station includes a processor coupled to each of an in-band signaling tone detector, a memory, and an in-band signaling tone generator. The in-band signaling tone detector receives a first in-band signaling tone corresponding to a request by a second mobile station to reserve a floor of the communication session, converts the received in-band signaling tone to a corresponding first value, and routes the first value to the processor. The memory stores values corresponding to in-band signaling tones and programs associated with interpreting the values. The processor receives the value from the in-band signaling tone detector, determines, based on the first value and by reference to the memory, that the value corresponds to a request by a second mobile station to reserve a floor of the communication session, and instructs the in-band signaling tone generator to generate a second in-band signaling tone that controls access to the floor of the communication session. The in-band signaling tone generator generates the second in-band signaling tone.

Still another embodiment of the present invention encompasses a mobile station capable of converting a voice call from one of a dispatch mode voice call or an interconnect mode voice call to the other mode voice call. The mobile station includes a processor coupled to each of an in-band signaling tone detector and a memory. The in-band signaling tone detector receives an in-band signaling tone corresponding to a request to switch over to the other mode voice call, converts the received in-band signaling tone to a corresponding value, and routes the first value to the processor. The memory that stores values corresponding to in-band signaling tones and programs associated with interpreting the values. The processor receives the value from the in-band signaling tone detector, determines, based on the value and by reference to the memory, that the value corresponds to a request to switch over to the other mode voice call, and determines whether to switch to the other mode voice call based on the received request.

Yet another embodiment of the present invention encompasses a mobile station capable of converting a voice call from one of a dispatch mode voice call or an interconnect mode voice call to the other mode voice call. The mobile station includes a processor coupled to each of a user interface, a memory, and an in-band signaling tone generator. The user interface receives a user request from a user of the mobile station to switch over to the other mode voice call. The memory stores values corresponding to in-band signaling tones and programs associated with interpreting the values. The processor receives the user request and generates a request to switch over to the other mode voice call. The in-band signaling tone generator receives the request to switch over to the other mode voice call and converts the received request to a corresponding in-band signaling tone.

Still another embodiment of the present invention encompasses a first mobile station that is capable of creating a talkgroup. The mobile station includes a memory that stores multiple mobile station (MS) identifiers, wherein a first MS identifier of the multiple MS identifiers is associated with the first mobile station and a second MS identifier of the multiple MS identifiers is associated with a second mobile station. The first mobile station further includes a processor coupled to the memory that selects at least the second mobile station as a member of the talkgroup, associates, in the memory, the second MS identifier with the first MS identifier, and conveys, to the second mobile station, talkgroup information, wherein the talkgroup information comprises the first MS identifier in association with the second MS identifier.

The present invention may be more fully described with reference to FIGS. 1-6. FIG. 1 is a block diagram of a wireless communication system 100 in accordance with an embodiment of the present invention. Communication system 100 includes multiple Base Station Subsystems (BSSs) 111-113 (three shown) that are each operably coupled to a respective Central Base Station Controller (CBSC) of multiple CBSCs 121-123 (three shown). Each of the multiple CBSCs 121-123 is in turn operably coupled to a Mobile Switching Center (MSC) 130. Those who are of ordinary skill in the art realize that one or more of CBSCs 122 and 123 may be operably coupled to a different MSC than MSC 130, in which event MSC 130 may communicate with such CBSC via the CBSC's corresponding MSC, without departing from the spirit and scope of the present invention.

Communication system 100 further comprises multiple mobile stations (MSs) 101-103 (three shown) that are each a member of a talkgroup 104. Each MS of the multiple MSs 101-103 is in wireless communication with a respective BSS of the multiple BSSs 111-113. Each BSS 111-113 provides communications services to a respective MS 101-103 via a respective forward link 140, 150, 160 and a respective reverse link 145, 155, 165. Each forward link 140, 150, 160 includes a respective paging channel 141, 151, 161, a respective at least one forward link control channel 142, 152, 162 and a respective at least one forward link traffic channel 143, 153, 163. Each reverse link 145, 155, 165 includes a respective reverse link access channel 146, 156, 166, a respective at least one reverse link control channel 147, 157, 167, and a respective at least one reverse link traffic channel 148, 158, 168.

MSC 130 includes, or is operably coupled to, a location database 132 that stores an MS identifier associated with each MS 101-103 active in an area serviced by MSC 130 and maintains and tracks provisioning and mobility information with respect to each such MS, including registration of the MS when the MS activates in communication system 100. Database 132 may be included in a Home Location Register (HLR) or a Visited Location Register (VLR) as known in the art, or a combination of a HLR and a VLR, or a combination of one or more HLRs and/or VLRs. BSSs 111-113, CBSCs 121-123, MSC 130, and location database 132 are collectively referred to herein as a wireless infrastructure 134.

Preferably, communication system 100 is a Code Division Multiple Access (CDMA) communication system, in which communication channels of a forward link 140, 150, 160 or a reverse link 145, 155, 165, such as access channels, control channels, paging channels, and traffic channels, comprise orthogonal codes, such as Walsh Codes, that are transmitted in a same frequency bandwidth. However, those who are of ordinary skill in the art realize that communication system 100 may operate in accordance with any wireless telecommunication system, such as but not limited to a Global System for Mobile Communications (GSM) communication system, a Time Division Multiple Access (TDMA) communication system, a Frequency Division Multiple Access (FDMA) communication system, or an Orthogonal Frequency Division Multiple Access (OFDM) communication system.

Figure 2:
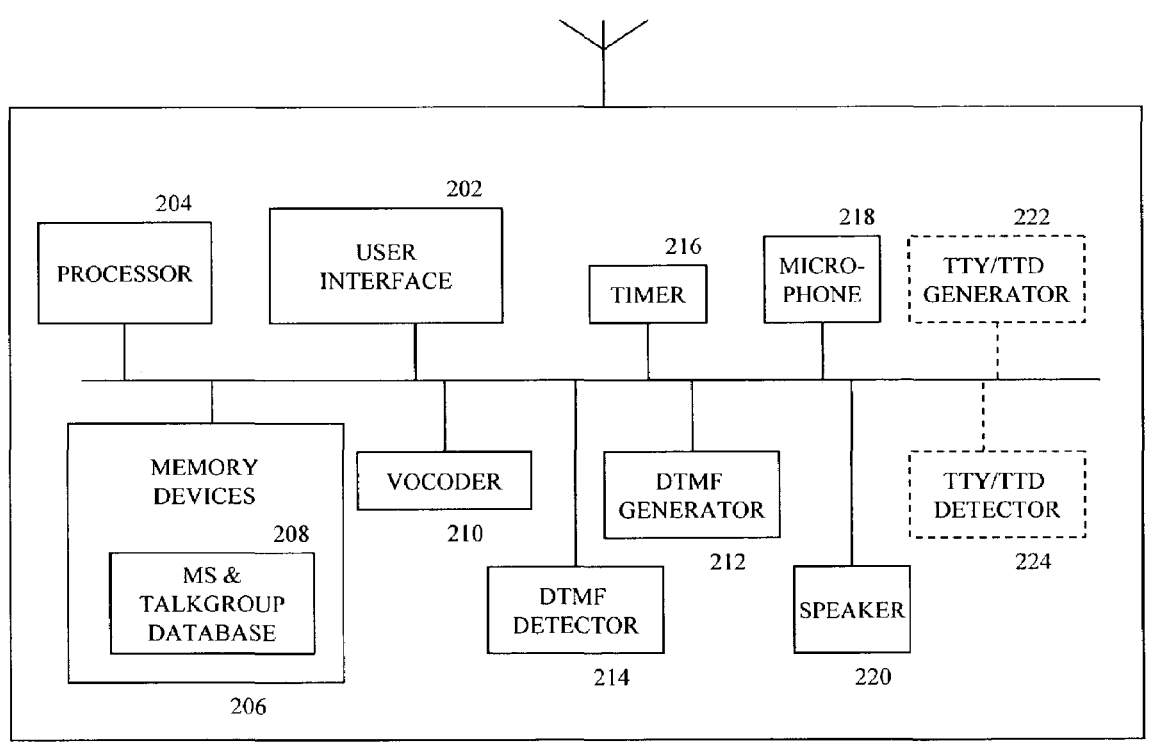
FIG. 2 is a block diagram of a mobile station of FIG. 1 in accordance with an embodiment of the present invention.

FIG. 2 is a block diagram of a mobile station (MS), such as MSs 101-103, in accordance with an embodiment of the present invention. Each MS of the multiple MSs 101-103 includes a user interface 202 coupled to a processor 204, such as one or more microprocessors, microcontrollers, digital signal processors (DSPs), combinations thereof or such other devices known to those having ordinary skill in the art. Each MS further includes one or more memory devices 206 associated with processor 204, such as random access memory (RAM), dynamic random access memory (DRAM), and/or read only memory (ROM) or equivalents thereof, that store data and programs that may be executed by the processor. Each MS further includes a DTMF generator 212 that generates DTMF signals, a DTMF detector 214 that responds to DTMF signals, a microphone 218, and a speaker 220 that are each coupled to processor 204. In another embodiment of the present invention, each MS may further include a TTY/TTD (TeleTYpewriter/Telecommunications Device for the Deaf) generator 222 that generates TTY/TTD signals and a TTY/TTD detector 224 that responds to TTY/TTD signals.

User interface 202 provides a user of the MS with the capability of interacting with the MS, including inputting instructions into the MS. In one embodiment of the present invention, user interface 202 includes a display screen and a keypad that includes multiple keys, including a Push-to-Talk (PTT) key. In another embodiment of the present invention, user interface 202 includes a display screen that comprises a touch screen that is able to determine a position (i.e., an X-coordinate and a Y-coordinate) of a user's touch on the touch screen and convey the position data to processor 204. Based on the position data, processor 204 then translates the user's touch into an instruction. Preferably, the display screen may display a "keypad" screen that comprises multiple softkeys such softkeys corresponding to keys on a conventional telephone keypad and further including a PTT softkey.

Memory devices 206 store an MS identifier that is uniquely associated with the MS. Memory devices 206 further include, or are coupled to, a mobile station and talkgroup database 208. Database 208 stores MS identifiers associated with one or more other MSs that subscribe to the services of communication system 100. The MS identifiers may be preprogrammed into database 208 or may be added to the database by a user of the MS. When the MS is a member of a talkgroup, database 208 further stores, in association with the talkgroup, a talkgroup identifier and an associated list of MS identifiers, wherein each MS identifier in the list of MS identifiers corresponds to an MS that is a member of the talkgroup. In addition, memory devices 206 store instructions facilitating operation of the MS in an emulated dispatch mode or in an interconnect mode and further store instructions and data that allow the MS to perform all functions necessary to operate in communication system 100, including storing Service Option (SO) values and values corresponding to DTMF tones that are used for in-band signaling as is described in greater detail below.

In one embodiment of the present invention, a user of an MS may create a talkgroup by compiling a list of MS identifiers associated with the talkgroup, wherein the MS then assigns an associated talkgroup identifier to the talkgroup. A creator of the talkgroup may then edit the talkgroup by deleting one or more members from the talkgroup or by adding one or more members to the talkgroup. When the creator of a talkgroup creates or edits the talkgroup, the associated MS conveys the talkgroup identifier and the list of associated MS identifiers to MSC 130. In another embodiment of the present invention, communication system 100 may further include a Dispatch Applications Server operably coupled to MSC 130 or to each CBSC 121-123 that performs the functions of MSC 130 herein with respect to creation and modification of a talkgroup. MSC 130 then forwards the talkgroup identifier and the list of associated MS identifiers to each member of the talkgroup. Upon receiving the talkgroup identifier and the list of associated MS identifiers, each MS that is a member of the talkgroup stores the talkgroup identifier in association with the list of associated MS identifiers in database 208 of the receiving MS. In another embodiment of the present invention, the talkgroup identifier and the list of associated MS identifiers may be preprogrammed into the MS by a vendor of the MS.

Figure 3:
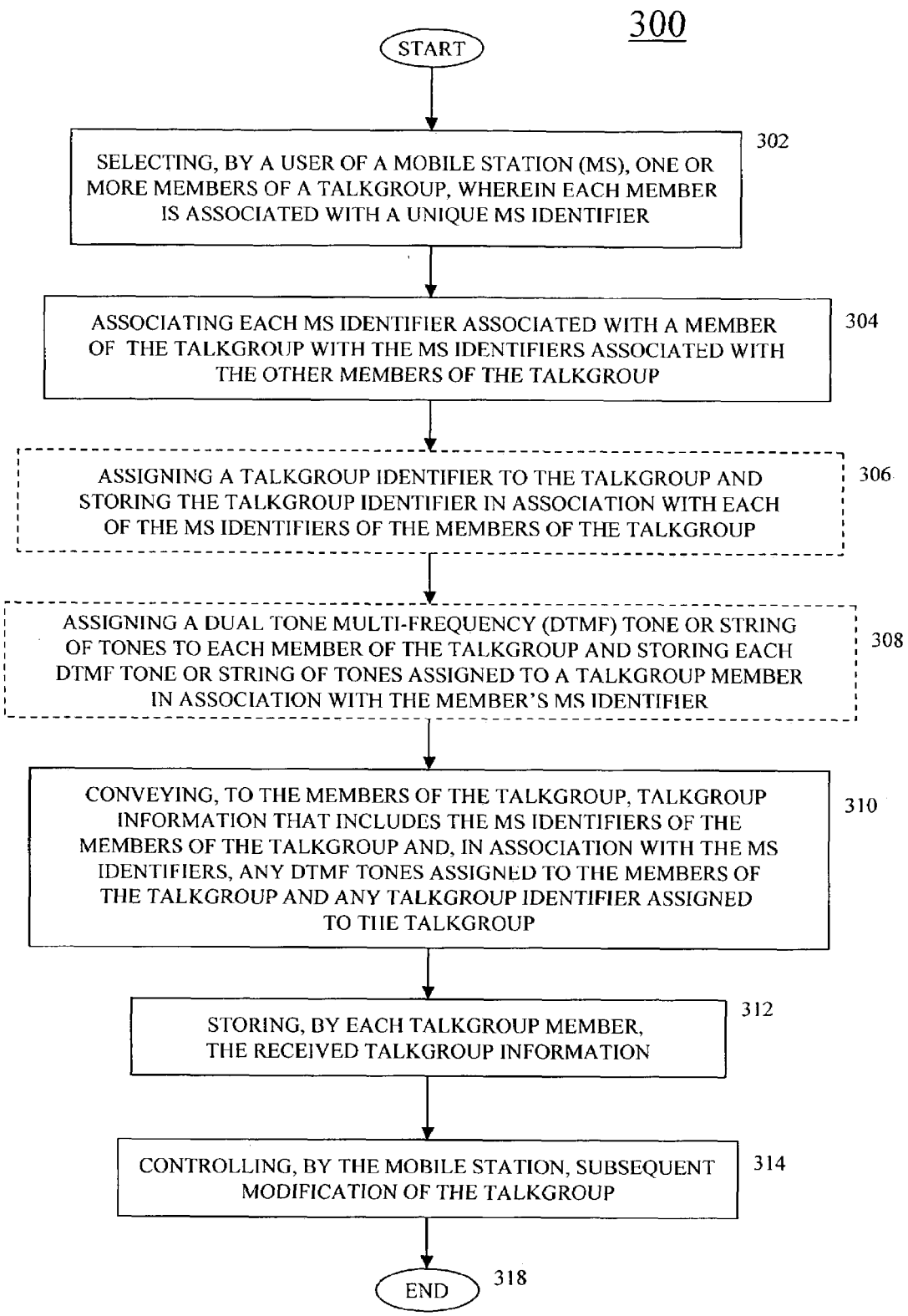
FIG. 3 is a logic flow diagram of a process executed by a mobile station of FIG. 1 in setting up a talkgroup in accordance with an embodiment of the present invention.

FIG. 3 is a logic flow diagram 300 depicting a method by which a talkgroup creator, such as MS 101, can create a talkgroup, such as talkgroup 104, in accordance with an embodiment of the present invention. Logic flow diagram 300 begins when a user of MS 101 selects (302), from a menu of other users appearing on a display screen of user interface 202, one or more users, such as MSs 102 and 103, to be members of the talkgroup. Preferably, an MS identifier associated with each listed user is stored in database 208 of the MS 101. MS 101 associates (304) the MS identifier associated with each member of the talkgroup with the MS identifiers associated with the other members of the talkgroup. Preferably, MS 101 associates the MS identifiers with each other by assigning (306) a talkgroup identifier to the talkgroup and storing the talkgroup identifier, in association with each member's MS identifier, in database 208. However, when the talkgroup includes only a single MS, there may be no need to assign a talkgroup identifier to the talkgroup. MS 101 also conveys (310) talkgroup information concerning the talkgroup to MSC 130 via a reverse link control channel, that is, control channel 148. Preferably, the talkgroup information includes MS identifiers corresponding to the selected one or more MSs and/or any associated talkgroup identifier.

Upon receiving the talkgroup information from MS 101, MSC 130 forwards the talkgroup information to each MS that is included in the newly created talkgroup, that is, MSs 102 and 103, via a respective forward link control channel 152, 162. Upon receiving the talkgroup information, each talkgroup member, that is, MSs 102 and 103, stores (312) the talkgroup information, that is, the MS identifiers and/or an associated talkgroup identifier, in the MS's database 208.

Preferably, any subsequent modification of the talkgroup is controlled (314) by the creator of the talkgroup, that is, MS 101. For example, only the talkgroup creator may add a new member to, or delete a current member from, the talkgroup. When the talkgroup creator modifies the membership of the talkgroup, the talkgroup creator conveys new talkgroup information, such as a new list of talkgroup members (i.e., MS identifiers associated with the talkgroup members) and an associated talkgroup identifier, to the talkgroup members, including any deleted and/or added member.

Upon receiving new talkgroup information, that is, the talkgroup identifier and the associated MS identifiers, each talkgroup member's MS 102, 103 checks database 208 included in the MS to determine whether the talkgroup identifier is already stored in the database. When the talkgroup identifier is stored in the database and the MS is being deleted from the talkgroup, the MS deletes the talkgroup identifier and the associated MS identifiers from the MS's database 208. When the talkgroup identifier is stored in the database and the MS is not being deleted from the talkgroup, the MS may edit the list of associated MS identifiers stored in the database in accordance with the received list of associated MS identifiers or the MS may overwrite the stored list of associated MS identifiers with the received list of MS identifiers. When the talkgroup identifier is not stored in the MS's database 208, the MS stores, in the database, the received talkgroup identifier in association with the received list of MS identifiers.

By allowing an MS, such as MS 101, to create and manage a talkgroup, communication system 100 provides talkgroup management that is transparent to the underlying network, that is, infrastructure 134, and that imposes minimal overhead on the implementing communication system. By providing for talkgroup creation and management that is transparent to the infrastructure, the talkgroup system may be implemented in a legacy communication system without modification of an infrastructure, such as an already existing CDMA communication system that provides only interconnect services and not dispatch services.

Figure 4A:
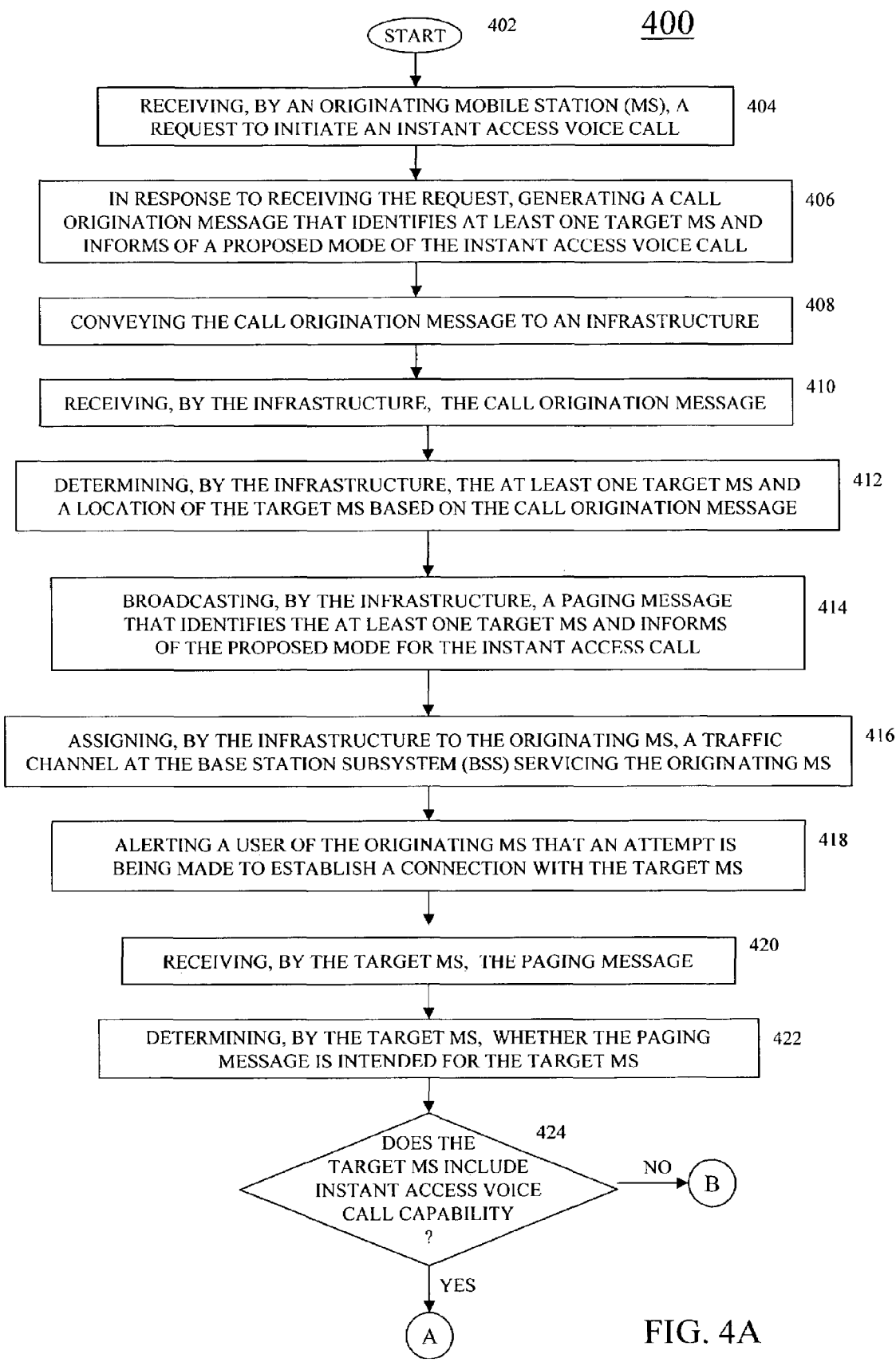
FIG. 4A is a logic flow diagram of a process executed by the communication system of FIG. 1 in establishing an Instant Access voice call in accordance with an embodiment of the present invention.
Figure 4B:
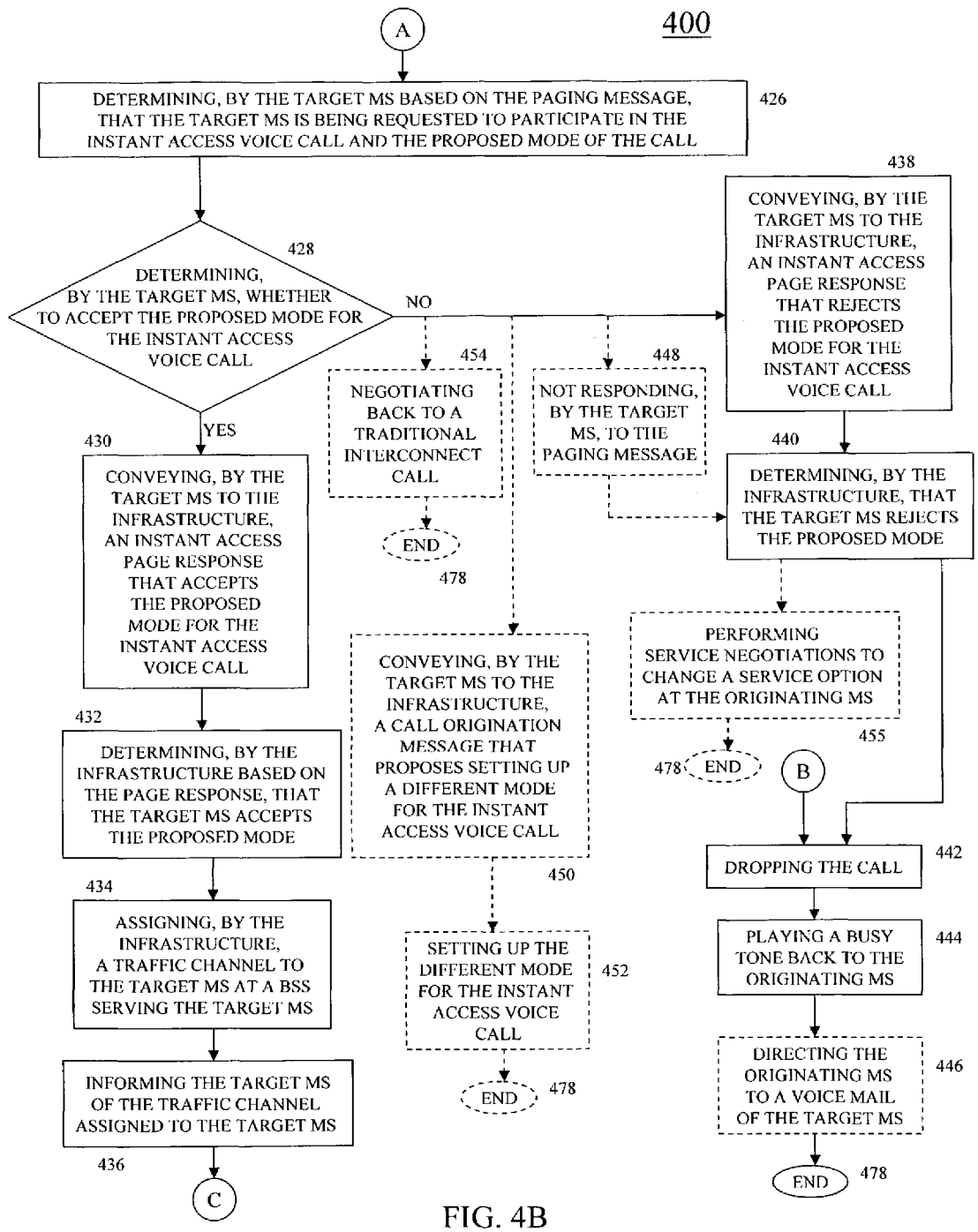
FIG. 4B is a continuation of the logic flow diagram of FIG. 4A of a process executed by the communication system of FIG. 1 in establishing an Instant Access voice call in accordance with an embodiment of the present invention.
Figure 4C:
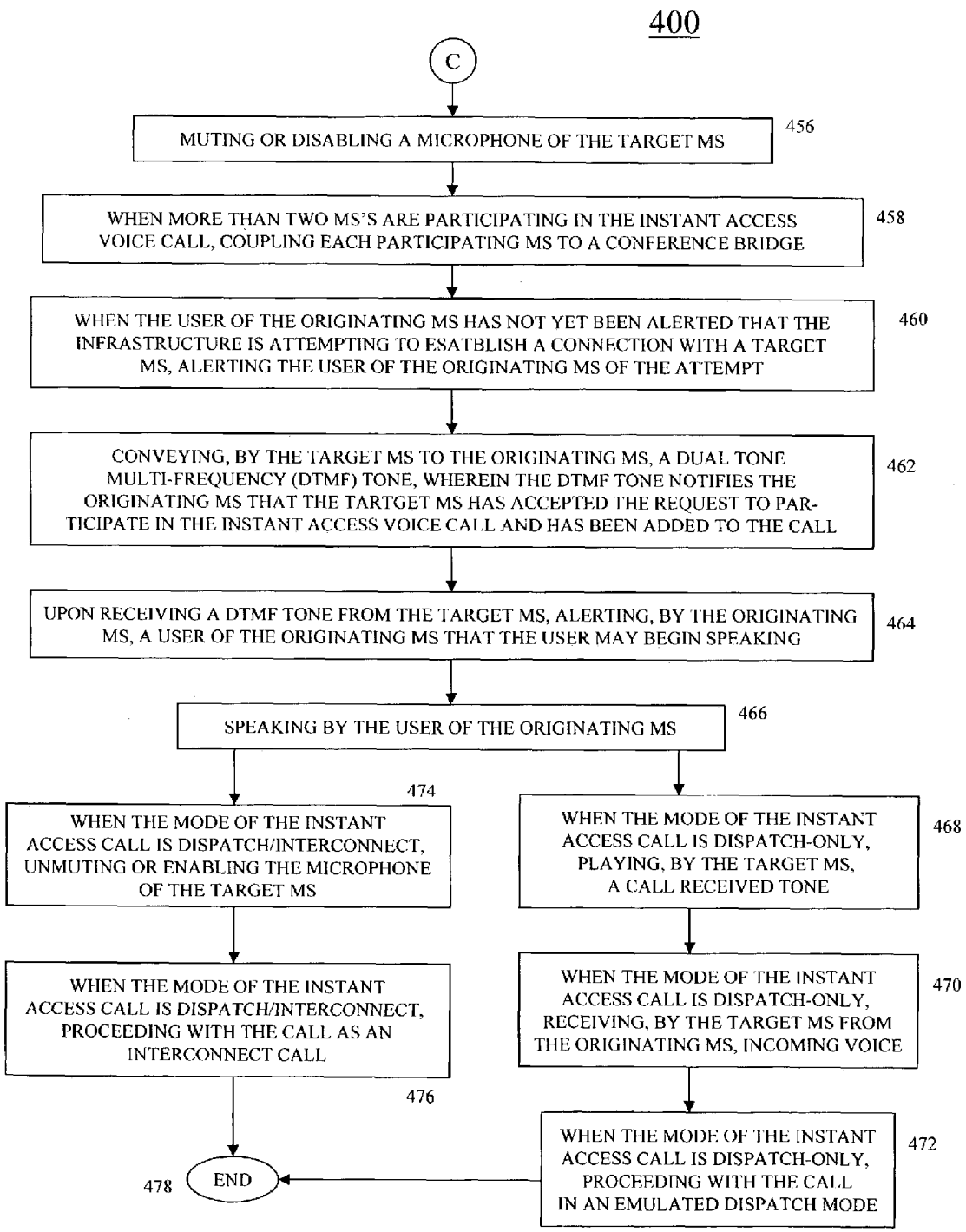
FIG. 4C is a continuation of the logic flow diagrams of FIGS. 4A and 4B of a process executed by the communication system of FIG. 1 in establishing an Instant Access voice call in accordance with an embodiment of the present invention.

Referring now to FIGS. 4A, 4B, and 4C, a logic flow diagram 400 is provided that illustrates an Instant Access call service provided by communication system 100 in accordance with an embodiment of the present invention. An Instant Access voice call may be set up by any MS 101-103 in communication system 100 with any other MS or user, or any group of MSs or users, in the communication system. For example, upon creation of a talkgroup, which may comprise as few as two members, any member of the talkgroup, such any of MSs 101-103 with respect to talkgroup 104, may originate an Instant Access voice call with the other members of the talkgroup.

In communication system 100, the Instant Access call service allows a user of an originating MS to quickly establish either of two modes of voice call, that is, a first mode of a voice call comprising an emulation of a dispatch voice call or a second mode of a voice call comprising a hybrid dispatch/interconnect voice call. An emulated dispatch call comprises an interconnect call that can be instantly set up and wherein only one participant in the call is able to speak, that is, to transmit voice, at a time, similar to a dispatch call. For example, in one version of an emulated dispatch call, only one participant's microphone 218 is enabled at any particular time while the other participants' microphones 218 are disabled and their speakers 220 are enabled. A hybrid dispatch/interconnect call comprises an interconnect call that can be instantly set up, similar to a dispatch call, but then proceeds as an interconnect call. In addition, as described in greater detail below, communication system 100 further provides for negotiation of a setup of an emulated dispatch call to an interconnect call, and for negotiation of a setup of a hybrid dispatch/interconnect call to an emulated dispatch call.

The logic flow begins (402) when an originating MS, such as MS 101, receives (404) a user request to initiate an Instant Access voice call from a user of the MS. Preferably, the user inputs the user request into the MS by merely pushing or touching a single key on a keypad included in user interface 202. For example, the user may depress a key or touch a softkey included in the user interface 202 of originating MS 101 that is associated with one of the multiple modes of an Instant Access voice call. Preferably, the user of MS 101 is able to select from multiple keys that each corresponds to a different mode. For example, the user may propose a first mode, such as a 'Dispatch-only' mode (i.e., an emulated dispatch mode), for the Instant Access voice call by depressing or touching a first key or softkey of the multiple keys, and may propose a second mode, such as a 'Dispatch/Interconnect' mode (i.e., a hybrid dispatch/interconnect mode), for the Instant Access voice call by depressing or touching a second key or softkey of the multiple keys. In another embodiment of the present invention, a user may initiate an Instant Access call by selecting, from a menu appearing on a display screen of user interface 202, text corresponding to a 'Dispatch-only' voice call or text corresponding to a 'Dispatch/Interconnect' voice call.

In one embodiment of the present invention, the originating MS may be preprogrammed to set up an Instant Access voice call with a predetermined MS or group of MSs, such as talkgroup 104, which predetermined MS or group of MSs is stored in memory devices 206 and/or database 208 of the MS. In another embodiment of the present invention, the user of the originating MS may select a user or a group of users with whom to set up the call. For example, when the user, that is, the user's MS, is a member of multiple talkgroups, in response to the indication by the user of a desire to initiate an Instant Access voice call, the MS may present the user with a menu of the multiple talkgroups on a display screen of user interface 202. The user may then select a talkgroup from the displayed menu of talkgroups. In another embodiment of the present invention, instead of selecting a talkgroup, the user may select, from a menu displayed on the display screen, one or more targeted MSs with which the user wishes to engage in an Instant Access voice call.

In response to receiving the user request to initiate an Instant Access voice call, originating MS 101 generates (406) a request to initiate an Instant Access voice call that is conveyed to infrastructure 134. Preferably, the request generated by MS 101 comprises an Instant Access call origination message that identifies the target users, or MSs, and informs of the proposed mode of the call, that is, informs whether a Dispatch-only call or a Dispatch/Interconnect call is being proposed. Preferably the call origination message is a Layer 3 call origination message that includes a Service Option (SO) data field in which originating MS 101 embeds a first service option (SO) value, such as 'NN,' for a Dispatch-only call or a second service option value, such as 'MM,' for a Dispatch/Interconnect call. The Layer 3 call origination message further includes a talkgroup identifier and/or an MS identifier that identifies the targeted party or parties. The originating MS, that is, MS 101, conveys (408) the call origination message to infrastructure 134 via a reverse link access channel, that is, access channel 146, and the BSS servicing the originating MS, that is, BSS 111.

Upon receiving (410) the call origination message, infrastructure 134 routes the message to the MSC servicing originating MS 101, that is, MSC 130. MSC 130 stores the call origination message in a memory of the MSC. Based on the call origination message, MSC 130 determines (412) the targeted MSs. MSC 130 further determines a location of each targeted MS, such as MSs 102 and 103, by reference to location database 132. MSC 130 then signals each CBSC servicing a targeted MS, that is, CBSCs 122, 123, to broadcast an Instant Access paging message to the targeted MSs serviced by the CBSC. In response to the instructions, each CBSC 122, 123 then broadcasts (414) an Instant Access paging message via a respective paging channel 151, 161.

The Instant Access paging message identifies the targeted MSs serviced by the CBSC, informs that an Instant Access call is being requested, and informs of the proposed mode of the Instant Access call. Preferably, each Instant Access paging message comprises a data packet that includes the MS identifiers of the targeted MSs serviced by the CBSC broadcasting the paging message. In another embodiment of the present invention, when a talkgroup is being paged, the Instant Access paging message may include a talkgroup identifier in addition to, or instead of, the MS identifiers. Each Instant Access paging message further includes a Service Option (SO) data field in which MSC 130 or the broadcasting CBSC embeds an SO value corresponding to the proposed mode for the call, such as an SO value of 'NN' for a Dispatch-only call or an SO value of 'MM' for a Dispatch/Interconnect call.

In addition, upon receiving the call origination message from originating MS 101, MSC 130 instructs the CBSC servicing the originating MS, that is CBSC 121, to assign, and the CBSC assigns (416), a forward link traffic channel 143 and a reverse link traffic channel 148 to the originating MS at the BSS servicing the MS, that is, BSS 111. In other embodiments of the present invention, traffic channels 143 and 148 may be assigned by MSC 130 or BSS 111. Infrastructure 134, preferably MSC 130 or CBSC 121, then alerts (418) the user of originating MS 101 that the infrastructure is trying to establish a connection with the target MSs by playing a ring back tone over the assigned forward link traffic channel, or, in the event that the ring back tone is stored in the originating MS, by instructing the originating MS to play a ring back tone. The ring back tone is played to the user of the originating MS while the MS is awaiting a response from the one or more target MSs. However, in another embodiment of the present invention, as described in greater detail below, MSC 130 may not play a ring back tone, or instruct the originating MS to play a ring back tone, until an affirmative response has been received from a target MS.

In another embodiment of the present invention, instead of depressing a key or touching a softkey, the user of an originating MS, such as MS 101, may originate an Instant Access call by inputting an Instant Access telephone number, such as "1-888-xxx-xxxx," into the user's MS. For example, a first Instant Access telephone number may correspond to a first mode of Instant Access voice call, that is, a Dispatch-only call, and a second Instant Access telephone number may correspond to a second mode of Instant Access voice call, that is, a Dispatch/Interconnect call. In response to receiving the Instant Access telephone number, the originating MS 101 assembles a call origination message comprising a data packet that includes the number dialed and the MS identifier associated the originating MS. When the target of the call is a group of users, the data packet may further include an associated talkgroup identifier. MS 101 then conveys the data packet to infrastructure 134.

Upon receiving the call origination message, infrastructure 134 routes the data packet to MSC 130. Based on the dialed telephone number included in the message, MSC 130 determines that the call is an Instant Access call and further determines the requested mode of the call. As described above, MSC 130 stores the call origination message in a memory of the MSC and determines a location of each targeted MS, such as MSs 102 and 103, based on the call origination message and by reference to location database 132. MSC 130 then signals each CBSC servicing a targeted MS, that is, CBSCs 122, 123, to broadcast an Instant Access paging message to the targeted MSs serviced by the CBSC.

In response to the instructions, each CBSC 122, 123 then broadcasts an Instant Access paging message. As described above, each Instant Access paging message comprises a data packet that includes the MS identifiers of the targeted MSs serviced by the CBSC broadcasting the paging message and further includes an SO data field in which MSC 130 or the CBSC embeds an SO value corresponding to the proposed mode of the call. When a talkgroup is being paged, the Instant Access paging message may include a talkgroup identifier in addition to, or instead of, the MS identifiers.

Upon receiving (420) the Instant Access paging message, each target MS 102, 103 determines (422) whether the target MS is an intended recipient of the Instant Access paging message by reference to the MS identifier and/or talkgroup identifier included in the message. When the target MS includes Instant Access voice call capability (424), the target MS also determines (426), based on the value embedded in the SO data field of the Instant Access paging message, that the MS is being requested to participate in an Instant Access voice call and the proposed mode for the call, that is, whether a Dispatch-only call or a Dispatch/Interconnect call is being requested. Each target MS 102, 103 then determines (428) whether to accept the proposed mode of the Instant Access voice call.

In one embodiment of the present invention, a target MS may automatically determine whether to accept or reject the request. For example, a target MS that lacks a capability to engage in an emulated dispatch call may automatically reject a request to set up a Dispatch-only voice call and may automatically accept a request to set up a Dispatch/Interconnect call. By way of another example, a target MS that is capable of engaging in both a Dispatch voice call and an Interconnect call may automatically accept any Instant Access call set up request regardless of the proposed mode. The automatic responses may be programmed into the MS by a vendor or may be programmed into the MS by a user, or some responses may be programmed by the vendor and other responses may be programmed by the user.

In another embodiment of the present invention, upon determining that the Instant Access paging message concerns an Instant Access voice call, a target MS may first query a user of the MS before responding. For example, the target MS may audibly or visually alert the user to receipt of the Instant Access paging message. The MS may present a text message in a display screen included in user interface 202 that queries the user as to whether the user wishes to engage in a Dispatch-only voice call or a Dispatch/Interconnect voice call, whichever is appropriate based on the Instant Access paging message, and provides a menu of proposed responses. The user then inputs a desired response by selecting a response from the menu.

Upon determining to respond to the Instant Access paging message or upon receiving a response from the user, the target MS 102, 103 assembles, and conveys (430, 438) to infrastructure 134, an Instant Access page response. The Instant Access page response includes a Special Service Option (SSO) extension comprising an SSO data field that informs of the target MS user's decision. For example, the SSO data field of the page response may be embedded with a bit with a value of '1' when the user accepts the proposed mode of the call and a bit value of '0' when the user rejects the proposed mode of the call.

In another embodiment of the present invention, when the Instant Access paging message informs that originating MS 101 has proposed a mode, such as a Dispatch-only voice call, that the target MS is not capable of engaging in, or does not desire to engage in, the target MS may not respond (448) to the paging message and may further not notify a user of the target MS of receipt of the paging message.

Upon receiving the Instant Access page response, infrastructure 134 routes the page response to MSC 130. Based on the value embedded in the SSO data field of Instant Access page response 413, MSC 130 determines (432, 440) whether the target MS has accepted the proposed mode of the Instant Access call. When MSC 130 determines (440) that the proposed Instant Access voice call has not been accepted by any target MS 102, 103, based on a page response received from each target MS or based on a failure of the infrastructure to receive a response from each target MS within a first predetermined time period, then the proposed Instant Access voice call may not go through. MSC 130 may drop (442) the call. MSC 130 also may play (444) a busy tone back to the originating MS 101 or, when the busy tone is stored in the originating MS, instruct the originating MS to play the busy tone. When the request has not been accepted by any target MS and there is only a single target MS, MSC 130 also may direct (446) the originating MS 101 to a voicemail for the target MS.

In another embodiment of the present invention, when the mode proposed by originating MS 101 is a Dispatch/Interconnect call, and MSC 130 determines (440) that the request has not been accepted by any target MS 102, 103, MSC 130 may initiate (455) negotiations between the MSC and the originating MS, and the MSC and a target MS, for a traditional, interconnect voice call. In such an event, MSC 130 assigns forward link and reverse link traffic channels to the target MS during the set up of the call. When the call is set up and the user of the target MS verbally answers the call, a traditional interconnect voice call may begin. No Talk Permit Tone (TPT) tone need then be played to the user of the originating MS.

In yet another embodiment of the present invention, when the target MS is not capable of engaging in, or does not desire to engage in, the proposed mode of the call, such as a Dispatch-only call, instead of conveying an Instant Access page response rejecting the proposed mode of the Instant Access call or not responding at all, the target MS may respond to the Instant Access paging message by proposing (450) a different mode, such as a Dispatch/Interconnect mode, for the Instant Access call. That is, in such an instance, the target MS may respond to the Instant Access paging message by conveying an Instant Access call origination message to infrastructure 134 requesting to initiate the different mode, that is the Dispatch/Interconnect mode, of the call with originating MS 101. Communication system 100 then attempts to set up (452) a Dispatch/Interconnect call between MS 102 and MS 101 via the Instant Access call setup procedures described herein with reference to FIG. 4. That is, upon receiving the Instant Access call origination message from the target MS, infrastructure 134, in particular MSC 130, inquires of originating MS 101, preferably by conveying a paging message to the originating MS, as to whether the originating MS accepts the different mode for the Instant Access call. Originating MS 101 may then respond to the paging message in any one of the manners described herein with respect to possible responses to a paging message.

In still another embodiment of the present invention, when the target MS lacks the capability to set up an Instant Access voice call, or a Dispatch-only mode Instant Access voice call has been proposed by the originating MS and the target MS is not capable of engaging in an emulated dispatch call, the target MS may try to negotiate (454) back to a traditional, interconnect call.

In yet another embodiment of the present invention, MSC 130 may include or be operably coupled to a mobile station database 136. Mobile station database 136 stores a profile of each MS 101-103 included in communication system 100, which profile includes an associated MS identifier, the services subscribed to by the MS, and the service options available to the MS, such as Dispatch-only calls and Dispatch/Interconnect calls. When a first mode, such as a Dispatch-only mode of an Instant Access voice call, is proposed by originating MS 101 and MSC 130 determines (440) that the request has not been accepted by any target MS 102, 103, the MSC may then review the profile of the originating MS stored in database 136. When no alternative service option is listed in the profile, the MSC drops the call (442) and arranges (444) for a busy tone to be played back to the originating MS 101 or directs (446) the originating MS 101 to a voicemail for the target MS. When an alternative service option is listed in the profile, such as a Dispatch/Interconnect mode of an Instant Access voice call, MSC 130 can perform (448) service negotiations to change the SO for the call at the originating MS.

When MSC 130 determines (432) that a target MS 102, 103 has accepted the proposed mode for the Instant Access call, the MSC instructs the corresponding CBSC 122, 123 to assign (434) to the target MS a respective forward link traffic channel 153, 163 and a respective reverse link traffic channel 158, 168 at a respective BSS 112, 113. Upon assigning the traffic channels, the CBSC conveys (436) a signaling message to the corresponding target MS informing of the assigned traffic channel. Upon receiving the signaling message informing of the assigned traffic channel, a target MS 102, 103 that has accepted the request mutes, or disables, (456) a microphone 218 of the MS and enters into an emulated dispatch mode where the target MS can only receive voice and cannot transmit voice. When the Instant Access call includes more than two parties, MSC 130 may also couple (458) the each participating MS to a conference bridge, which conference bridge is part of an applications platform that is included in or operably coupled to the MSC. The participating MSs may each be coupled to the conference bridge at any time after a traffic channel has been assigned to the participating MS.

In addition, when MSC 130 determines that a target MS 102, 103 has accepted the proposed mode for the Instant Access voice call, MSC 130 signals the CBSC servicing the originating MS 101, that is, CBSC 121, that an Instant Access call is being established. In another embodiment of the present invention, MSC 130 may not play a ring back tone, or instruct originating MS 101 to play a ring back tone, upon receiving call origination message 405. Instead, MSC 130, or CBSC 121 based on the signal received from MSC 130, may alert (460) the user of the originating MS that the infrastructure is attempting to establish a connection with a target MS by playing a ring back tone, or instructing the originating MS to play a ring back tone, after the target MS has accepted the request to establish an Instant Access voice call.

Upon determining to accept the request to set up an Instant Access call, the target MS further conveys (462) a DTMF tone or tones to originating MS 101 via the reverse link traffic channel assigned to the MS, the forward link traffic channel assigned to the originating MS, and infrastructure 134. Preferably, the processor 204 of the target MS instructs DTMF generator 212 to generate the DTMF tone or tones, in response to which the DTMF generator generates the DTMF tone or string of tones and transmits the tone or string of tones.

The DTMF tone or tones serve to notify originating MS 101 that the target MS has accepted the request to set up an Instant Access call and has been added to the call. When originating MS 101 receives a DTMF tone, the originating MS routes the received DTMF tone to DTMF detector 214. DTMF detector 214 converts the received DTMF tone to a value and routes the value to processor 204. Processor 204 is then able to determine a corresponding meaning of the value by reference to memory devices 206.

Upon receiving a DTMF tone from all targeted MSs, or upon receiving a DTMF tone from at least one target MS within a second predetermined period of time, originating MS 101 audibly or visually alerts (464) the user of the originating MS that the user may begin speaking, preferably by playing Talk Permit Tone (TPT) to the user. The originating MS, preferably processor 204 of the MS, measures the second predetermined period of time with reference to a timer 216 included in the MS. In response to the TPT, the user of originating MS 101 may begin speaking (466).

When a Dispatch-only call is being set up, each target MS, upon accepting the proposed mode for the Instant Access call and transmitting the DTMF signal to the originating MS, also plays (468) a Private (or Group) Call Received Tone (PCRT) to the user of the target MS. The PCRT is then followed by reception (470) of incoming voice from the user of the originating MS over the target MS's speaker 220 and the call proceeds (472) as an emulated dispatch call. That is, at any one time, only one MS has its microphone 218 unmuted or enabled and may transmit voice data and all other participants in the call have their microphones 218 muted, or disabled, and may only receive voice data. When the Instant Access voice call is a 'Dispatch/Interconnect' call, each target MS that has been added to the call, upon transmitting the DTMF signal to the originating MS or upon receiving voice from the originator of the call, unmutes, or enables, (474) the target MS's microphone 218 and the call proceeds (476) in as an interconnect call. In another embodiment of the present invention, the unmuting, or enabling, of the microphone may not be automatic. Instead, the microphone may be nmated, or enabled, in response to a user of the target MS depressing a key displayed on user interface 202 that instructs the MS to revert to an interconnect call.

In one embodiment of the present invention, wherein a group of target MSs are requested to participate in an Instant Access call, the originating MS may individually solicit the participation of each target MS in the call. That is, the originating MS may convey a separate call origination message for each target MS to infrastructure 134. The originating MS may send the separate call origination messages successively, rather than concurrently, where each successive call origination message is sent after the originating MS receives a responsive DTMF tone from a target MS in regard to an immediately preceding call origination message, or after a third predetermined period of time expires after the conveyance by the originating MS of the immediately preceding call origination message, or after the originating MS gets a busy tone from a target MS associated with the immediately preceding call origination message. The originating MS, preferably processor 204 of the MS, measures the third predetermined period of time with reference to a timer 216 included in the MS. By conveying the call origination messages one at a time, the originating MS is able to determine which target MS is responding when the originating MS receives a responsive DTMF tone.

However, when a talkgroup is large, individual solicitation of the members of the talkgroup may be cumbersome and inefficient. Therefore, in another embodiment of the present invention, wherein a talkgroup includes more than two MSs, the MS originating the Instant Access call, such as MS 101, may assign a unique DTMF tone or string of DTMF tones to each of the other members 102, 103 of the talkgroup. Originating MS 101 stores each assigned DTMF tone or string of tones, in association with an MS identifier of the corresponding MS, in the originating MS's database 208. When the originating MS conveys a call origination message to infrastructure 134, the MS includes, in the call origination message, each MS identifier in association with a value corresponding to the MS's assigned DTMF tone or tones. When infrastructure 134 then conveys (408) the Instant Access paging messages to the target MSs, each Instant Access paging message includes, for each target MS, an MS identifier and an associated DTMF tone or tones. Upon receiving the Instant Access paging message, each talkgroup member 102, 103 then stores the received MS identifiers and each identifier's associated DTMF tone or tones in the member's database 208.

Referring now to FIGS. 3 and 4, in yet another embodiment of the present invention, when an MS, such as MS 101, creates a talkgroup, such as talkgroup 104, the creator may assign (308) a different DTMF tone or strings of tones to each member 101-103 of the talkgroup. The assigned DTMF tones and their associated MS identifiers are then conveyed by the talkgroup creator, that is, MS 101, to the other members of the talkgroup, that is, MSs 102 and 103, via infrastructure 134 as part of the talkgroup information conveyed to the members upon creation of the talkgroup. Each talkgroup member, that is, MSs 101-103, stores (314) each assigned DTMF tones in association with the corresponding MS identifier in the member's database 208. To avoid any potential confusion when MSs may be members of multiple talkgroups and, as a result, are each assigned multiple identifying DTMF tones, each MS may further store, in database 208, a talkgroup identifier in association with each DTMF tone and MS identifier, which talkgroup identifier is also included in the talkgroup information received by the MS upon creation of each talkgroup. A target MS, upon receiving an assignment of a traffic channel, may then convey (462) to the originating MS the DTMF tone assigned by the originating MS to the target MS. When the originating MS receives (464) the target's DTMF tone in response to conveying an Instant Access call origination message to infrastructure 134, the originating MS is able to determine the target MS that has accepted, and joined, the call.

By allowing an originating MS, such as MS 101, to initiate a voice call with one or more target MSs, such as MSs 102 and 103, by conveying a call origination message to infrastructure 134, the infrastructure notifying each target MS of the call by paging the target MS, and each target MS notifying the originating MS of the target MS's participation in the call by conveying a DTMF tone to the originating MS, communication system 100 provides a process for setting up an Instant Access voice call that allows for the fast interconnections required by dispatch users and that does not require that the MSs 101-103 be typical dispatch radiotelephones. The process further provides for a setting up of both dispatch-type (emulated dispatch) and interconnect (hybrid dispatch/interconnect) Instant Access calls, and for a switching of a mode of the call when a target MS does not desire to engage in, or is not capable of engaging in, the mode of Instant Access call requested by the originating MS. The process further provides for establishment of a traditional interconnect call when an originating MS attempts to set up an Instant Access call with a legacy MS that does not include any Instant Access call capability. As a result, an originating MS may attempt to establish a Instant Access call with any MS in system 100 without a need to first determine the capabilities of the target MS and without requiring that the target MS be Instant Access call enabled. The originating MS may further set up an Instant Access call with a group of target MSs, as opposed to a single target MS, and may set up a dispatch-type Instant Access call with the group or an interconnect Instant Access call with the group, wherein the latter may utilize a conference bridge in order to connect all members of the group to the call.

Figure 5:
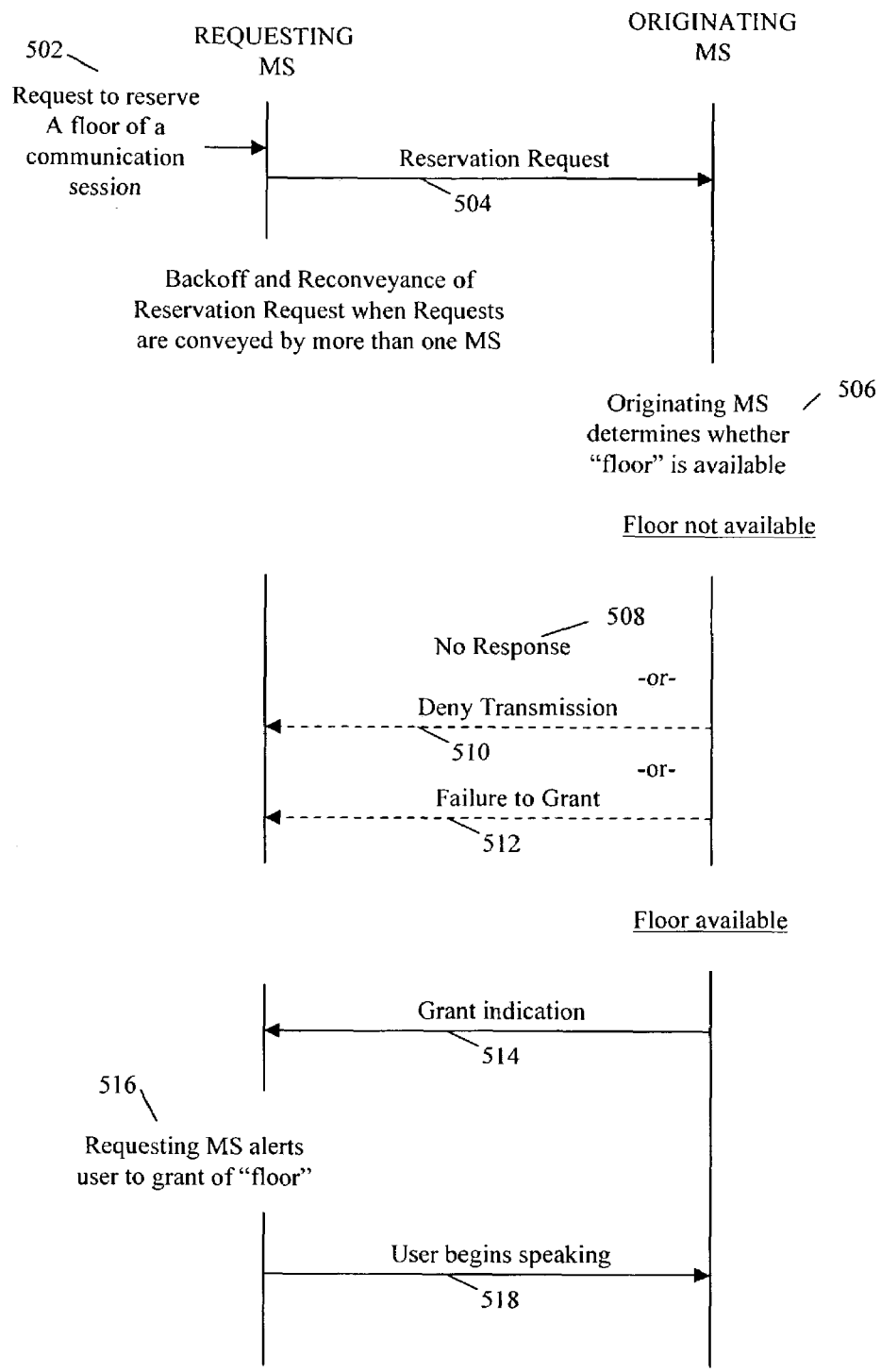
FIG. 5 is a signal flow diagram of in-band floor control of a communication session in accordance with an embodiment of the present invention.

When the Instant Access call set up by the originating MS, that is, MS 101, is an emulated dispatch call, communication system 100 must provide a floor (also known as a Talk prerogative) control, or talker arbitration, mechanism to determine which MS may be the speaker, that is, has the right to transmit voice data, at any particular time. Referring now to FIG. 5, a signal flow diagram 500 illustrates a scheme for in-band floor control by communication system 100 in accordance with an embodiment of the present invention. Signal flow diagram 500 begins when a user of an MS, such as MS 102, participating in the call wishes to reserve a floor of the communication session. The user inputs (502) a request to reserve the floor into the user's MS, preferably by depressing a key, or touching a softkey, preferably a PTT key, of the MS's user interface 202. In response to receiving (502) the request, the user's MS, that is, MS 102, conveys (504) an in-band floor reservation request to originating MS 101 via their respective traffic channels 158 and 143. Although the floor control scheme is described with respect to a floor reservation request by MS 102, those who are of ordinary skill in the art realize that the scheme applies to a floor reservation request by any MS participating in the communication session, including the originating MS.

The floor reservation request comprises at least one DTMF tone. In one embodiment of the present invention, the DTMF tone may just be a DTMF tone associated with the PTT key. In another embodiment of the present invention, the DTMF tone may be the DTMF tone or string of DTMF tones assigned to the MS requesting the floor, thereby identifying the requestor's MS to the originating MS. In yet another embodiment of the present invention, the floor reservation request may comprise a string of DTMF tones, which string includes one or more DTMF tones indicating that the string is a floor reservation request and further includes the DTMF tone or tones assigned to the requestor's MS. The at least one DTMF tone may further include error detection and error correction DTMF tones added to the at least one DTMF by processor 204 of the requestor's MS.

Upon receiving the floor reservation request, originating MS 101 determines (506) whether the floor is available. When the originating MS 101 determines that the floor is not available, for example, is under the reservation of another MS participating in the dispatch call, originating MS 101 may not respond (508) to the floor reservation request. In another embodiment of the present invention, when originating MS 101 determines that the floor is not available, the originating MS 101 may convey, via traffic channels 148 and 153, an in-band floor control message that fails to grant the request to reserve the floor. In one embodiment of the present invention, the originating MS may convey (510) to the requesting MS a message that denies the request to reserve the floor, such as a floor control message that comprises a predetermined string of DTMF tones. In another such embodiment of the present invention, the originating MS may convey (512) a message that fails to grant the floor to a requesting MS, such as a message comprising a string of DTMF tones that do not correspond to an identifier of the requester MS, or that do not correspond to an identifier of any MS participating in the call.

When the floor is available, upon receiving the request, the originating MS conveys (514) to the requesting MS 102, via traffic channels 148 and 153, an in-band floor control message granting the request to reserve the floor. In one embodiment of the present invention, the grant may merely comprise an echoing back of the DTMF tone or string of DTMF tones received by originating MS 101. In another embodiment of the present invention, the grant may be a separate message comprising a string of DTMF tones that are uniquely associated with the requesting MS. Since the grant is conveyed in-band, the originating MS may convey the grant to each MS participating in the dispatch call. Upon receiving the grant, each MS determines whether the MS is the intended recipient of the grant, that is, whether the MS is associated with the DTMF tones included in the grant. When a requestor MS determines that it is the intended recipient of the grant, the requestor MS audibly or visually alerts (516) the user of the MS that the user has been granted the floor, and the user may begin speaking (518).

In another embodiment of the present invention, each of multiple MSs participating in the group call, such as MSs 102 and 103, concurrently may attempt to reserve the floor by conveying a DTMF floor reservation request to originating MS 101. When multiple MSs 102, 103 concurrently attempt to reserve the floor, the floor reservation requests sent by each MS will collide, resulting in garbled DTMF tones that cannot be deciphered by originating MS 101. When each requesting MS 102, 103 detects that the MS's request has been garbled, the MS backs off for a period of time measured by reference to a timer 216 included in the MS and then resends a floor reservation request. The amount of time backed off by each requesting MS 102, 103 may be random or may be predetermined and different for each MS. For example, communication system 100 may employ an ALOHA or a slotted ALOHA algorithm for determining the back off and resend period for each MS.

Although the signaling conveyed between the MS in logic flow diagram 500 is described above as comprising DTMF tones, those who are of ordinary skill in the art realize that the signaling conveyed between MS may utilize any in-band signaling tone format generated by an appropriate in-band signaling tone generator and detected by an appropriate in-band signaling tone detector without departing from the spirit and scope of the present invention. For example, in yet another embodiment of the present invention, a TTY/TTD embodiment, the in-band floor control scheme depicted by FIG. 5 may utilize TTY/TTD (TeleTYpewriter/Telecommunications Device for the Deaf) tones instead of DTMF tones for in-band arbitration of floor reservation requests. That is, in the TTY/TTD embodiment, each of the floor reservation request and messages failing to grant a reservation of the floor, denying a request to reservation the floor, and granting a reservation of the floor may comprise a TTY/TTD tone or tones, instead of a DTMF tone or tones, that is generated by a TTY/TTD generator 222 and detected by a TTY/TTD detector 224 of a corresponding MS.

By providing for in-band control of an emulated dispatch call that utilizes in-band signaling tones, communication system 100 provides an efficient, high speed floor control protocol that is transparent to the underlying network, that is, infrastructure 134, and that imposes minimal overhead on the implementing communication system. Again, since the floor control protocol that is transparent to the underlying network, the floor control protocol may be implemented in a legacy system without requiring any modification of the underlying network. Furthermore, since the floor control protocol utilizes in-band signaling, the floor control protocol imposes no load upon the control channels of communication system 100 and does not require implementation of any new control channel signals.

Figure 6:
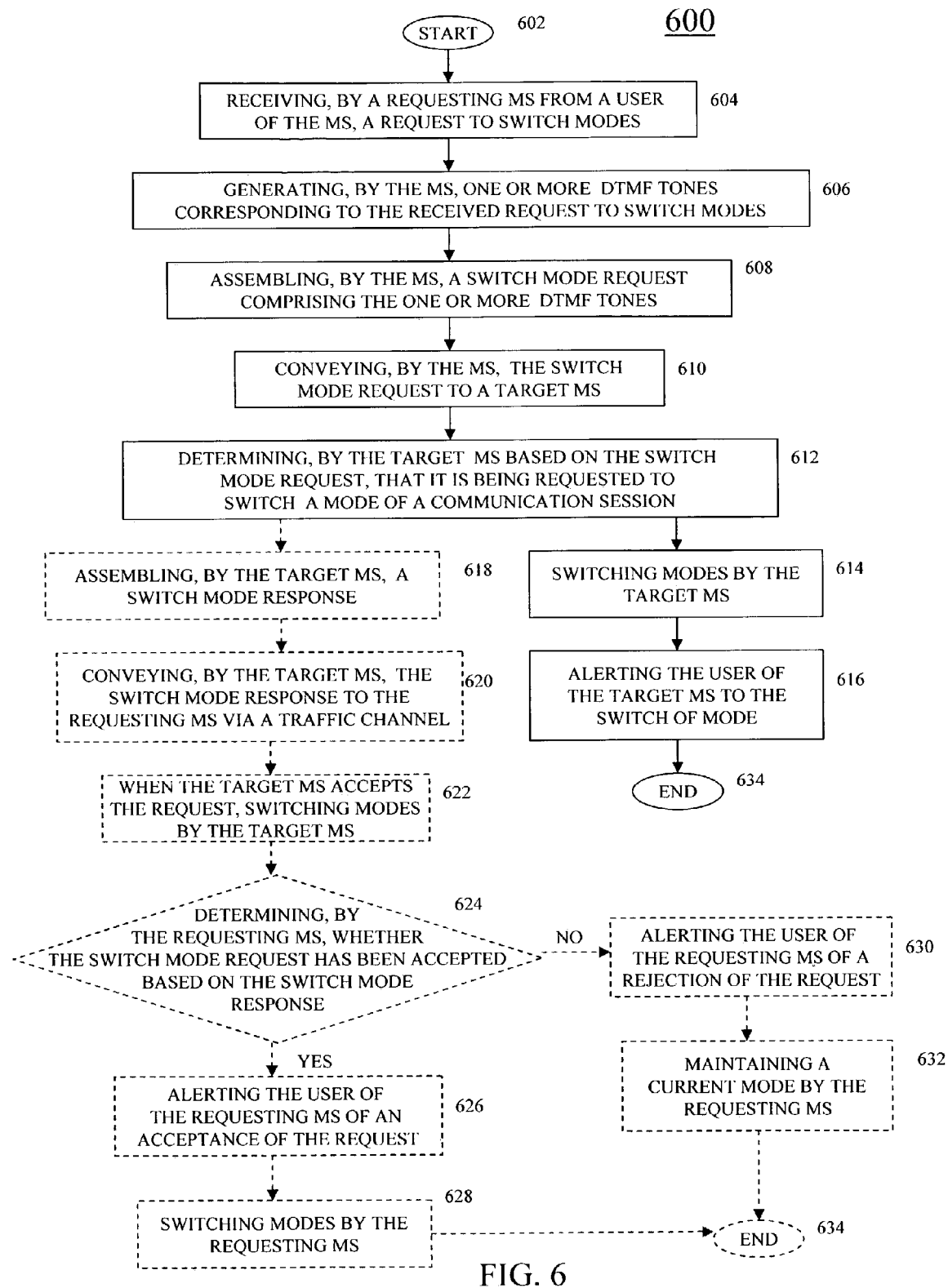
FIG. 6 is a logic flow diagram of a scheme for switching modes of a communication session via in-band signaling in accordance with an embodiment of the present invention.

At times during an Instant Access communication session, a participant may desire to switch from a current mode of voice communication, such as emulated dispatch, to another mode of voice communication, such as interconnect, or visa versa. Also, as mentioned above in regard to step 450 of FIG. 4, during a setting up of an Instant Access communication session, an originating MS may originate a service negotiation for an Instant Access call and a target MS may respond by proposing a different mode of Instant Access call. Those who are of ordinary skill in the art realize that there are other scenarios wherein a switch of a mode of a voice communication may be desired, and the reference to these two particular scenarios is intended to illustrate scenarios wherein a switch of mode of voice call is desired and attempted and is not intended to limit the invention in any way. Referring now to FIG. 6, a logic flow diagram 600 illustrates a scheme for switching modes of a communication session via in-band signaling in accordance with an embodiment of the present invention. Logic flow diagram 600 begins (602) when a requesting MS, such as MS 101, receives (604) a request to switch modes from a user of the MS. For example, a user engaged in a dispatch call may input a switch mode request by depressing or touching a 'Interconnect' key or softkey on a keypad included in the user interface 202 of the requesting MS to switch to an interconnect call. By way of another example, and a user engaged in an interconnect call may input a switch mode request depressing or touching a 'Dispatch' key or softkey on a keypad included in the user interface 202 of the requesting MS to switch to a dispatch call.

In response to the user's inputting a switch mode request, the user's MS, that is, MS 101, and preferably DTMF generator 212 in response to an instruction received from processor 204, generates (606) one or more tones of a switch mode set of Dual Tone Multi-Frequency (DTMF) tones. For example, a first tone or tones of the switch mode set of DTMF tones, such as DTMF tones 'AA,' may correspond to a request to switch from a dispatch call to an interconnect call. A second tone or tones of the switch mode set of DTMF tones, such as DTMF tones 'ZZ,' may correspond to a request to switch from an interconnect call to a dispatch call.

In another embodiment of the present embodiment, the MS may be aware of the mode of call in which the user is engaged and may determine an appropriate tone based on the current mode of the communication session. Upon determining to switch modes, MS 101 conveys (608) DTMF tones corresponding to the switch mode request as Layer 2 signaling to the other MSs participating in the call, for example, MS 102, via infrastructure 134 and the reverse link and forward link traffic channels respectively assigned to requesting MS 101 and target MS 102. Although MS 101 is referenced herein as the requesting MS and MS 102 is referenced herein as the target MS, these MSs are so designated merely for the purpose of illustrating the principles of the present invention and those who are of ordinary skill in the art realize that any participant in a communication session may request a switch to another mode of voice communication.

In yet another embodiment of the present invention, a target MS may decide not to accept a proposed mode for an Instant Access voice call, as described above with respect to step 428 of FIG. 4, and may not respond to the request to initiate an Instant Access voice call of the originating MS, as described above with respect to step 448 of FIG. 4, or may respond to the request with a page response that rejects the proposed mode of the Instant Access call, as described above with respect to step 440 of FIG. 4. In such scenarios, infrastructure 134 may perform service negotiations, a described in step 455 of FIG. 4, to switch modes of the Instant Access call by generating a switch mode request comprising a DTMF tone or tones and conveying the switch mode request to MS 101. In still another embodiment of the present invention, the switch mode request generated by MS 102 may be in any format. The switch mode request generated by MS 102 is conveyed by the MS to infrastructure 134. Upon receiving the switch mode request from MS 102, infrastructure 134 may perform service negotiations to switch modes of the Instant Access call by generating a switch mode request comprising a DTMF tone or tones and conveying the switch mode request to MS 101. Upon receiving the DTMF tones corresponding to the switch mode request, target MS 102, preferably processor 204 of the MS, determines (610) that it is being asked to switch the mode of the communication session based on the DTMF tones. Preferably, the received DTMF tones are routed to DTMF detector 214, which converts the received DTMF tones to corresponding values and routes the values to processor 204. Processor 204 then determines the meaning of the values by reference to memory devices 206. Upon determining that the DTMF tones correspond to the switch mode request, target MS 102 automatically switches (612) to the requested mode and generates (614) an alert, preferably a warble sound, that notifies the user of MS 102 of the switch of modes. The logic flow then ends (632). In an embodiment where target MS automatically switches mode of voice call upon receiving the switch mode request, requesting MS 101 also switches mode of voice call upon conveying the switch mode request. For example, if the communication session is an emulated dispatch session wherein only the speaker's microphone 218 is enabled, the target MS and requesting MS each switches to a typical interconnect communication session mode wherein both the microphone 218 and speaker 220 of each participant's MS are enabled. By way of another example, if the communication session is an interconnect session that is switching to an emulated dispatch session, whichever of the target MS and the requesting MS does not have the floor switches to an emulated dispatch session mode and mutes the microphone 218 of the MS.

In another embodiment of the present invention, upon determining (610), by the target MS 102, that it is being asked to switch the mode of the communication session target MS 102 may convey (618), to requesting MS 102, a response to the switch mode request, such as an acceptance or a rejection of the request, via the traffic channels assigned to each of the requesting and target MSs. When the target MS accepts the request, the target MS also switches (620) modes to the requested mode. In one such embodiment of the present invention, the target MS may automatically convey (618) a response upon determining that it is being asked to switch the mode of the communication session. For example, the communication session may be an interconnect communication session and the switch mode request may comprise a request to switch to dispatch. When target MS 102 does not include a capability to engage in a dispatch voice call, the target MS may automatically reject the request. When target MS 102 includes a capability to engage in a dispatch voice call, the target MS may automatically accept the request. And when a target MS engaged in a dispatch voice call receives a switch mode request to switch to an interconnect call, the target MS may automatically accept, or may automatically reject, the request depending upon which response has been programmed into the MS. Those who are of ordinary skill in the art realize that numerous response scenarios may be programmed into the MS in regard to an automatic response to the request, and that the above scenario is presented merely for the purpose of illustrating the principles of the present invention. An automatic response scenario may be programmed into the MS by a vendor or may be programmed into the MS by a user, or some responses may be programmed by the vendor (for example, automatically rejecting a dispatch request when the MS lacks dispatch capability) and other responses programmed by the user.

In yet another embodiment of the present invention, upon receiving a switch mode request, target MS 102 may convey (618) a response to the request after querying a user of the MS as to how to respond. For example, the target MS may audibly or visually alert the user to receipt of the switch mode request and present a text message in a display screen of the MS's user interface 202 querying the user as to whether the user wishes to switch modes, that is, switch from a dispatch call to an interconnect call or from an interconnect call to a dispatch call, whichever is appropriate. The MS can also present the user with possible responses, wherein each possible response is represented by an icon or a selectable message presented on the screen. The user of the MS may then select a response by selecting the icon or text message.

Preferably, the switch mode response comprises a DTMF tone or tones that are conveyed to requesting MS 101 via Layer 2 signaling. A first switch mode response DTMF tone or tones may correspond to an acceptance of the switch mode request, and a second switch mode response DTMF tone or tones may correspond to a rejection of the switch mode request. The switch mode response may further include a DTMF tone or tones identifying the MS sourcing the response, that is, MS 102. The target MS, that is MS 102, then conveys (620) the switch mode response to requesting MS 101 via infrastructure 134, the reverse traffic channel assigned to the target MS 102, that is, channel 153 and the forward traffic channel assigned to MS 101, that is, channel 143. However, in another embodiment of the present invention, wherein the requesting MS 101 is awaiting a response, the target MS may reject the switch mode request by not responding to the request.

Upon receiving the switch mode response, requesting MS 101 determines (622), based on the DTMF tone or tones received by the requesting MS, whether the request has been accepted or rejected. When requesting MS 101 determines that the request has been accepted, the requesting MS plays (624) a switch mode audio acceptance alert, or displays a switch mode acceptance visual message on a display screen of the MS's user interface 202, and negotiates (626) a switch of modes. For example, when switching to an interconnect mode, the requesting and target MSs may engage in a plain old telephone service call setup negotiation. The logic flow then ends (632). When requesting MS 101 determines that the request has been rejected, the requesting MS plays (628) a switch mode audio rejection alert to the user, or displays a switch mode rejection visual message on a display screen of the MS's user interface 202, and maintains (630) the current mode, and the logic flow ends (632).

Although the signaling conveyed between the MS in logic flow diagram 600 is described above as comprising DTMF tones, those who are of ordinary skill in the art realize that the signaling conveyed between MS may utilize any in-band signaling tone format generated by an appropriate in-band signaling tone generator and detected by an appropriate in-band signaling tone detector without departing from the spirit and scope of the present invention. For example, in another embodiment of the present invention, a TTY/TTD embodiment, the switch mode scheme depicted by FIG. 6 may utilize TTY/TTD tones instead of DTMF tones. That is, in the TTY/TTD embodiment, each of the switch mode request and the switch mode response may comprise a TTY/TTD tone or tones, instead of a DTMF tone or tones, that is generated by a TTY/TTD generator 222 and detected by a TTY/TTD detector 224 of a corresponding MS.

In summary, a method and system are provided whereby dispatch-type services may be implemented in an interconnect communication system 100, such as a CDMA communication system. By providing talkgroup creation and management and in-band floor arbitration that are transparent to an underlying network, that is, infrastructure 134, the talkgroup creation and management and in-band floor arbitration may be implemented in a legacy system without the need to modify the network and regardless of the type of network employed. Furthermore, by providing Instant Access call set up procedures and mode switching procedures that predominantly utilize modified versions of known messages, their implementation in a legacy system is simplified, minimizing the impact of an addition of such procedures to a legacy network.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for establishing an Instant Access voice call in a wireless communication system, the method comprising:

receiving, from a first mobile station, a first request to initiate an Instant Access voice call, wherein the request proposes a first mode of the Instant Access voice call;

in response to receiving the first request, paging a second mobile station with a paging message, wherein the paging message informs of the proposed mode of the Instant Access voice call;

in response to paging the second mobile station, receiving, from the second mobile station, a second request to initiate an Instant Access voice call, wherein the second request proposes a second mode for the Instant Access voice call; and in response to receiving the second request, inquiring of the first mobile station whether the first mobile station accepts the proposed second mode of the Instant Access voice call, wherein one mode of the first and second modes is an emulated dispatch mode and the other mode of the first and second modes is an interconnect mode.

2. The method of claim 1, wherein the request to initiate an Instant Access voice call further identifies the second mobile station.

3. The method of claim 1, wherein the request to initiate an Instant Access voice call further identifies a talkgroup of which the second mobile station is a member.

4. The method of claim 1, wherein the request to initiate an Instant Access voice call comprises a call origination message that includes a Service Option (SO) data field and wherein a value embedded in the SO data field informs of the proposed mode of the Instant Access voice call.

5. The method of claim 1, wherein the paging message comprises a Service Option (SO) data field and wherein a value embedded in the paging message SO data field informs of the proposed mode of the Instant Access voice call.

6. The method of claim 1, further comprising, in response to receiving the request, assigning a traffic channel to the first mobile station.

7. The method of claim 1, further comprising:

failing to receive a response to the paging message from the second mobile station within a predetermined period of time; and determining, based on the failure to receive a response, to not establish the proposed mode of the Instant Access voice call.

8. The method of claim 1, further comprising:

failing to receive a response to the paging message from the second mobile station within a predetermined period of time; and determining, based on the failure to receive a response, to negotiate a traditional interconnect voice call.

9. The method of claim 1, further comprising:

in response to paging the second mobile station, receiving a response from the second mobile station indicating an acceptance by the second mobile station of the proposed mode of the Instant Access voice call; and upon receiving the response from the second mobile station, assigning a traffic channel to the second mobile station.

10. The method of claim 1, wherein the response to the paging message received from the second mobile station further indicates a rejection of the first mode of the Instant Access voice call.

11. The method of claim 1, wherein the response to the paging message comprises a Special Service Option (SSO) data field and wherein a value embedded in the SO data field informs whether the second mobile station accepts the proposed mode of the Instant Access voice call.

12. The method of claim 1, further comprising:
assigning a first traffic channel to the first mobile station; and
assigning a second traffic channel to the second mobile station.

13. The method of claim 1, further comprising, in response to receiving the second request, negotiating a traditional interconnect voice call between the first mobile station and the second mobile station.

14. The method of claim 1, further comprising signaling the first mobile station to alert a user of the first mobile station that an attempt is being made to establish an Instant Access voice call with the second mobile station.

15. The method of claim 1, further comprising receiving an acceptance from the first mobile station of the proposed second mode of the Instant Access voice call.

16. A method for initiating, by a mobile station, an Instant Access voice call in a wireless communication system, the method comprising:
presenting a user of the mobile station with a plurality of modes for an Instant Access voice call;
receiving, from the user of the mobile station, a first request to initiate a proposed first mode of Instant Access voice call of the plurality of modes of an Instant Access voice call;
in response to receiving the first request, generating a second request to initiate the proposed first mode of Instant Access voice call;
wirelessly conveying the second request; and
wirelessly receiving a response to the second request, wherein the response proposes a second mode for the Instant Access voice call, wherein one mode of the first and second modes is an emulated dispatch mode and the other mode of the first and second modes is an interconnect mode.

17. The method of claim 16, wherein the second request comprises a call origination message having a Service Option (SO) data field and wherein generating further comprises embedding a value in the SO data field that informs of the proposed first mode for the Instant Access voice call.

18. The method of claim 16, further comprising receiving a response to the second request informing of an attempt to establish the Instant Access voice call.

19. The method of claim 16, further comprising responding to the received response to the second request and receiving an assignment of a traffic channel.

20. The method of claim 16, further comprising accepting the proposed second mode for the Instant Access voice call.

21. The method of claim 16, wherein the response comprises a Dual Tone Multi-Frequency (DTMF) signal and wherein the method further comprises determining, based on the received DTMF signal, that a second mode for the Instant Access voice call is proposed.

22. The method of claim 21, wherein the mobile station comprises a first mobile station, wherein the received response to the second request comprises a proposal by a second mobile station of a second mode for the Instant Access voice call, and wherein the method further comprises identifying the second mobile station based on the Dual Tone Multi-Frequency signal.

23. The method of claim 21, further comprising, upon receiving the Dual Tone Multi-Frequency signal, alerting a user of the first mobile station to begin speaking.

24. A method for establishing, by a mobile station, an Instant Access voice call in a wireless communication system, the method comprising:
receiving a paging message requesting participation in a proposed first mode of an Instant Access voice call;
determining, based on the received paging message, not to accept the proposed first mode of the Instant Access voice call; and
in response to the determination, conveying a request that proposes a second mode for the Instant Access voice call, wherein one mode of the first and second modes is an emulated dispatch mode and the other mode of the first and second modes is an interconnect mode.

25. The method of claim 24, further comprising, in response to conveying the request, receiving an assignment of a traffic channel.

26. The method of claim 24, wherein the request comprises a page response.

27. The method of claim 26, wherein the paging response comprises a Special Service Option (SSO) data field and wherein a value embedded in the SSO data field informs of whether the mobile station accepts the proposed first mode of the Instant Access voice call.

28. The method of claim 24, wherein the method further comprises muting a microphone of the mobile station.

29. The method of claim 28, further comprising steps of:
receiving voice data; and
upon receiving voice data, unmuting the microphone.

30. The method of claim 24, wherein the method further comprises disabling a microphone of the mobile station.

31. The method of claim 30, further comprising steps of:
receiving voice data; and
upon receiving voice data, enabling the microphone.

32. A mobile station capable of participating in an Instant Access voice call, the mobile station comprising:
a memory that stores service option values corresponding to a plurality of modes of an Instant Access call;
a processor coupled to the memory that receives, from a user of the mobile station, a first request to initiate a first proposed mode of Instant Access voice call, in response to receiving the first request, generates a call origination message having a Service Option (SO) data field, embeds a value in the SO data field that informs of the proposed first mode the Instant Access voice call, conveys the call origination message, and receives a response to the call origination message, wherein the response proposes a second mode for the Instant Access voice call, wherein one mode of the first and second modes is an emulated dispatch mode and the other mode of the first and second modes is an interconnect mode.

33. The mobile station of claim 32, wherein the processor further alerts a user of the mobile station of the attempt to establish the Instant Access voice call.

34. The mobile station of claim 32, wherein the mobile station comprises a first mobile station and wherein the response to the call origination message comprises a proposal by a second mobile station of a second mode for the Instant Access voice call.

35. The mobile station of claim 32, wherein, in response to receiving the response to the call origination message, the mobile station accepts the proposed second mode for the Instant Access voice call.

36. The mobile station of claim 35, wherein, in response to accepting the proposed second mode for the Instant Access voice call, the mobile station receives an assignment of a traffic channel.

37. The mobile station of claim 32, wherein the mobile station further comprises a Dual Tone Multi-Frequency (DTMF) detector coupled to the processor, wherein the response to the call origination message comprises a DTMF signal, wherein the DTMF detector receives the DTMF signal and converts the DTMF signal to a corresponding value and conveys the value to the processor, and wherein the processor determines, based on the value received from the DTMF detector, that a second mode for an Instant Access voice call is proposed.

38. The mobile station of claim 37, wherein the mobile station comprises a first mobile station, wherein the response to the call origination message comprises a proposal by a second mobile station, and wherein the processor identifies the second mobile station based on the value corresponding to the Dual Tone Multi-Frequency signal and by reference to the memory.

39. The mobile station of claim 37, wherein the processor further alerts a user of the mobile station to begin speaking.

40. A mobile station capable of participating in an Instant Access voice call comprising:
   a memory that stores Service Option (SO) values corresponding to a plurality of modes of an Instant Access call; and
   a processor coupled to the memory that receives a paging message having an SO data field, determines, based on a value embedded in the SO data field and by reference to the memory, that the mobile station is being requested to participate in a proposed first mode of an Instant Access voice call, determines not to accept the proposed mode of the Instant Access voice call, and assembles and conveys a request that proposes a second mode for the Instant Access voice call, wherein one mode of the first and second modes is an emulated dispatch mode and the other mode of the first and second modes is an interconnect mode.

41. The mobile station of claim 40, wherein the request that proposes a second mode for the Instant Access voice call comprises a Special Service Option (SSO) data field and wherein the processor, with reference to the memory, embeds a value in the SSO data field that informs of whether the mobile station accepts the proposed mode of the Instant Access voice call.

42. The mobile station of claim 40, wherein the processor receives an assignment of a traffic channel in response to transmitting the request that proposes a second mode for the Instant Access voice call.

43. The mobile station of claim 40, wherein the processor further mutes a microphone of the mobile station.

44. The mobile station of claim 43, wherein the mobile station receives voice data and the processor, upon receiving the voice data, unmutes the microphone.

45. The mobile station of claim 40, wherein the processor further disables a microphone of the mobile station.

46. The mobile station of claim 45, wherein the mobile station receives voice data and the processor, upon receiving the voice data, enables the microphone.

* * * * *

UNITED STATES PATENT AND TRADEMARK OFFICE
CERTIFICATE OF CORRECTION

PATENT NO. : 7,319,879 B2  Page 1 of 1
APPLICATION NO. : 10/334814
DATED : January 15, 2008
INVENTOR(S) : John M. Harris et al.

It is certified that error appears in the above-identified patent and that said Letters Patent is hereby corrected as shown below:

On the title page item (73), should read:
Assignee:   Motorola, Inc., Schaumburg, IL (US)

Signed and Sealed this

Twenty-eighth Day of October, 2008

JON W. DUDAS
*Director of the United States Patent and Trademark Office*